April 29, 1930.  E. REIMANN  1,756,925

SYSTEM OF SPEED CONTROL FOR INDUCTION MOTORS

Filed Jan. 3, 1929

Inventor:
Erich Reimann,
by Charles E. Tullar
His Attorney.

Patented Apr. 29, 1930

1,756,925

UNITED STATES PATENT OFFICE

ERICH REIMANN, OF CHARLOTTENBURG, GERMANY, ASSIGNOR TO GENERAL ELECTRIC COMPANY, A CORPORATION OF NEW YORK

SYSTEM OF SPEED CONTROL FOR INDUCTION MOTORS

Application filed January 3, 1929, Serial No. 330,061, and in Germany May 15, 1928.

My invention relates to a system of speed control for induction machines in which commutator type regulating apparatus is employed in connection with the secondary circuit of the induction machine. In particular, my invention relates to the control of the speed-load characteristics of induction motors having a variable load and means for obtaining an irregular decrease in the speed of the motor at a predetermined load.

Where induction motors are used in power transmitting systems, as in conveying plants, rolling mills and the like, in which the force of rotating masses is applied for the equalization of energy, it is desirable that the speed of the induction motor should decrease slowly at the beginning of an increasing load, and thereafter upon the attainment of a certain load should decrease rapidly, so that until the predetermined load is attained the energy available in the centrifugal masses is not used, but then becomes effective to limit the energy taken from the line. By my invention I provide simple and reliable means for regulating the speed of induction motors above synchronism and causing the speed to decrease gradually at the beginning of an increasing load, but rapidly when a predetermined load is reached.

In carrying my invention into effect in one form I provide an induction motor connected in cascade to a commutator machine having two sources of excitation one source being a substantially constant voltage source, the other source being supplied with a variable voltage from the secondary of the induction motor. Preferably the commutator machine is provided with two exciting windings one of which is electrically connected to a frequency changing exciter, the other being connected to the secondary of the induction motor. According to my invention the excitation supplied by the two exciting windings operate substantially one against the other and at a predetermined load the effect of one winding mutually cancels the effect of the other winding.

Figure 1:
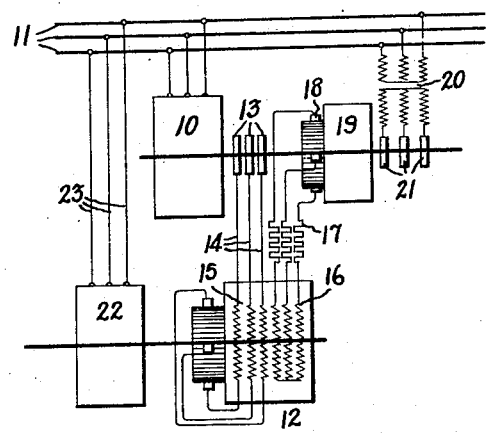

The features of my invention which are believed to be novel and patentable will be pointed out in the claims appended hereto For a better understanding of my invention reference is made to the accompanying drawing in which Fig. 1 shows diagrammatically one arrangement of a system of speed control in accordance with my invention. The curves in Fig. 2 represent the effect of various regulating systems on the speed of induction motors when operating with increasing loads and will be referred to in explaining the invention.

Referring to the drawing, in Fig. 1 I have represented an induction motor 10 arranged to have its primary connected to an alternating current supply system 11 and its secondary connected in cascade to a regulating commutator machine 12 through slip rings 13, leads 14 and the exciting winding 15. The exciting winding 16 is supplied with a constant excitation voltage from the frequency changer 19 through the adjustable brushes 18 and resistance 17. The frequency changer in this case is mounted on the same shaft as the main induction motor 10. The rotating member of the frequency changer 19 is fed from the alternating current supply system 11 through suitable step-down transformers 20 and slip rings 21. The regulating commutator machine in this instance is directly connected to an induction machine 22, which machine is electrically connected to the alternating current supply system 11 by means of line 23.

The exciting windings 15 and 16 of the commutator machine 12 are so arranged that the effective excitation of the two windings oppose each other. When the main induction motor 10 is caused to operate at or near its own synchronous speed the freqeuncy changing exciter 19 will supply direct current, or current of a low frequency, to the excitation winding 16 of the commutator machine 12. In order to reduce the inductive effect of the winding 16 at varying frequencies I provide an ohmic resistance 17 in its circuit. The excitation voltage supplied to winding 16 is substantially constant in magnitude while the excitation voltage of winding 15 varies with the load on the main induction motor 10.

Figure 2:
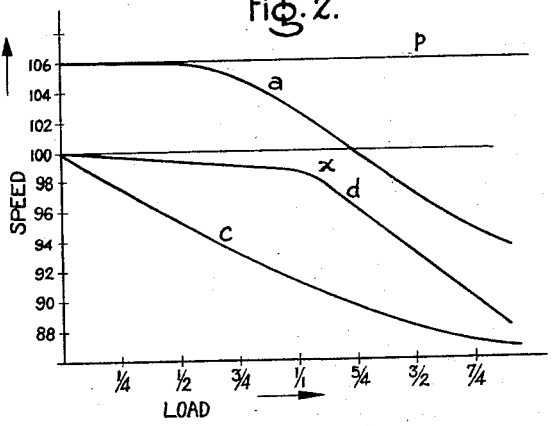

In Fig. 2 I have illustrated by curves the speed load characteristics of an induction motor when different systems of speed control are employed. The ordinates represent the speed of the induction motor 10 in per cent of synchronous speed. The abscissas represent the load on the motor. If a resistance is inserted in the secondary of an induction motor while operating with an increasing load at a speed corresponding to point X the speed will suddenly decrease as represented by the curve $d$. This method of speed control is accompanied by resistance losses and the disadvantage of being unable to switch in the resistance at a certain desired load, particularly so during sudden load impulses. In order to avoid these disadvantages a commutator regulating machine has heretofore been used having a series winding which is connected in the secondary circuit of the induction motor. Such a regulating machine is very effective at the beginning of an increasing load, but as the load on the motor is increased, thus increasing the current in its secondary, the series winding of the commutator regulating machine soon produces saturation of the commutator machine and thereafter its effect increases slowly with the increase in load. The effect of a regulating system of this kind is characterized by the curve $c$. The energy of the centrifugal masses is used up in such a system with small load peaks, while it should only be required by large load impulses.

It is well known that by means of the so-called Scherbius control, one modification of which is here described, the speed of a wound secondary induction machine may be varied from considerably below synchronism to considerably above synchronism, and vice versa. The theory of operation of such regulating apparatus is fully set forth for example in United States Patents 1,085,151 and 1,306,594. According to the arrangement here shown and described an irregular decrease in the speed of the motor may be obtained at a predetermined load even though the load is suddenly applied and without serious resistance losses. By the novel arrangement of my invention I provide two exciting windings 15 and 16 each being so arranged that the exciting current in one winding will oppose the exciting current in the other winding. The series winding is arranged to have a motor effect on the regulating machine 12 so its effect will tend to decrease the speed of the induction motor 10, while the winding 16 is connected to have a generator effect on the regulator machine. Thus winding 16 by supplying a voltage of sufficient magnitude to the secondary of the induction motor 10 through the series winding 15 will boost its speed above synchronism and will tend to cause it to maintain a constant speed with an increasing load as represented by the curve P. By exciting winding 16 in a manner that will subsequently be explained the simultaneous operation in opposition to each other of the windings 15 and 16 will result in causing the speed of the main induction motor 10 to decrease with an increasing load as represented by the curve $a$. This is accomplished by having the winding 16 excited so as to slightly over-saturate the commutator machine for no load supersynchronous speed of the main induction motor 10. As the load on the motor is increased the current in its secondary will be increased, thus increasing the current in the excitation winding 15 which will tend to neutralize the effect of the excitation current in winding 16. But the effect of the current in winding 16 will be sufficient to cause the motor 10 to operate at approximately constant speed until it is slightly under-saturated, then its effectiveness decreases very rapidly with an increase of current in winding 15. If the load on the induction motor is further increased so as to increase the current in its secondary the effect of the current in winding 15 will start to cancel the effect of the current in winding 16. The rapid drop in the speed of the induction motor 10 is illustrated as commencing at about three-fourths load. At this moment the energy stored in the centrifugal masses is utilized for meeting the load.

Where the speed regulation is from above synchronism to below synchronism, as provided for according to my invention, the commutator machine can be made smaller than if the entire regulation takes place with the motor 10 operating below synchronous speed and commutation can be more easily provided for. Also the power factor of the induction machine 10 may be controlled to some extent by shifting the brushes on the frequency changer exciter 19.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. A speed control system for induction motors comprising in combination with a wound secondary induction motor a commutator machine connected in cascade therewith, means for supplying said commutator machine with a substantially constant excitation of such magnitude that when acting alone it causes saturation of said commutator machine and the operation of said induction machine above synchronism, and means for supplying said commutator machine with an excitation that varies as the load on the induction motor and which opposes the substantially constant excitation.

2. A speed control system for induction motors comprising in combination with a wound secondary induction motor a commutator machine connected in cascade therewith, means for supplying said commutator machine with a substantially constant excitation of such magnitude as to cause said induction machine to operate above synchronism, and means for supplying said commutator machine with an excitation that varies as the load on the induction motor and which opposes the substantially constant excitation, said substantially constant excitation being sufficient to cause saturation of the commutator machine at no load on the induction motor.

3. A speed control system for alternating current induction machines, comprising in combination therewith a commutator machine having two exciting windings, a frequency changing exciter for supplying a voltage to one of said exciting windings of sufficient magnitude to cause saturation of said commutator machine, the other of said exciting windings being connected in cascade with said induction machine, the effect of the two exciting windings being opposed in the commutator machine.

4. A system of speed control for induction machines subject to variable loads comprising in combination with a wound secondary induction motor connected in cascade with a commutator regulating machine having two opposed exciting windings, a frequency changing commutator arranged to supply a voltage of substantially constant magnitude at a frequency proportional to the slip frequency of said induction machine to one of said exciting windings, the secondary of said induction machine being interconnected with the other of said exciting windings for supplying said winding with a voltage which varies in magnitude, said substantially constant excitation being sufficient to cause the induction motor to operate above synchronism and to cause saturation of the commutator machine at no load on the induction motor.

In witness whereof, I have hereunto set my hand this 8th day of December, 1928.

ERICH REIMANN.